Oct. 1, 1940.  M. GEIGER  2,216,168
DISTORTION CORRECTION CIRCUITS
Filed June 10, 1937
*Fig. 1*
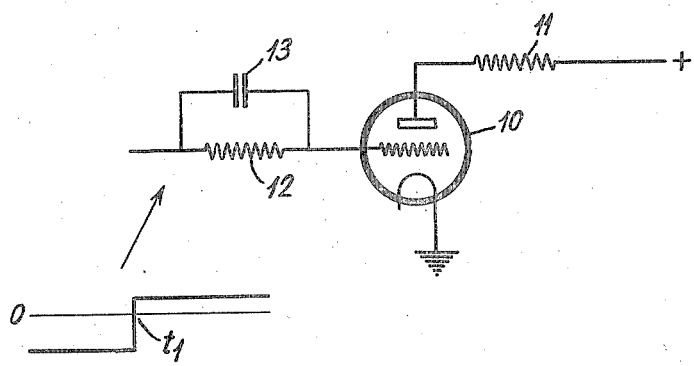
*Fig. 2*   *Fig. 3*
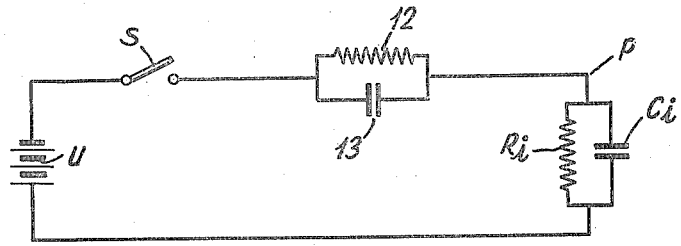
*Fig. 4*
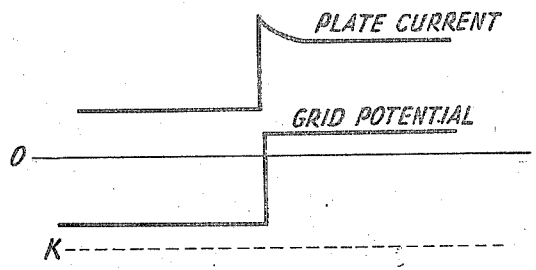
INVENTOR
MAX GEIGER
BY H. S. Srover
ATTORNEY Patented Oct. 1, 1940

2,216,168

UNITED STATES PATENT OFFICE 2,216,168

DISTORTION CORRECTION CIRCUITS

Max Geiger, Berlin, Germany, assignor to Telefunken Gesellschaft für Drahtlose Telegraphie m. b. H., Berlin, Germany, a corporation of Germany Application June 10, 1937, Serial No. 147,494
In Germany June 16, 1936

2 Claims. (Cl. 179—171)

My invention relates broadly to distortion correction and more particularly to a circuit arrangement for performing such correction.

It is a well known fact that steep voltage impulses when applied across a resistor to the control grid of an amplifier tube produce in the tube a grid current, and that using this circuit arrangement at very high impulse frequencies such as are employed for instance in television transmitters, an undesirable flattening out of the impulse front may be caused. Accordingly, it is one of the objects of my invention to correct this distortion.

My invention will best be understood by reference to the accompanying figures in which
 Fig. 1 is an embodiment of my invention,
 Fig. 2 is an explanatory curve,
 Fig. 3 is a schematic diagram, and
 Fig. 4 is a set of explanatory curves.

Referring to Fig. 1 of the drawing in which is shown an embodiment of my circuit arrangement, an amplifier tube 10 is shown whose plate circuit contains an output resistor 11 and whose grid circuit has an input resistor 12 coupled thereto. According to the invention, a condenser 13 is placed in parallel to the resistor 12. It is assumed that a voltage impulse having the form represented in Fig. 2 is applied across the resistor 12 to the control grid. The impulse voltage may be assumed to be negative relative to the cathode of tube 10 before a certain point $t_1$ is reached, whereby it is immaterial whether or not a plate current already flows during this negative impulse voltage. At the moment $t_1$ the impulse voltage shall have undergone a steep increase to a value that is positive relative to the cathode of the tube 10.

A close analysis of the circuit arrangement shown in Fig. 1 without condenser 13 has shown that during high frequency impulses, whose period is short as compared with the time interval between pulses, the grid cathode capacity of the tube 10 may play an important part. At the moment $t_1$ in which the tube receives a steep voltage impulse, the plate current in tube 10 will in fact increase only to the extent by which the grid-cathode inherent capacity is charged to a value greater than the potential across the resistor 12. This charging, as is known, takes place in accordance with an e-function just as in the case of any RC-member, so that therefore, the plate current of tube 10 likewise increases only in accordance with an e-function, as a result of which the circuit does not amplify the applied voltage impulse true to form.

When, assuming the aforementioned conditions, a condenser 13 is placed in parallel to the resistor, this drawback can be completely avoided. The voltage applied to the circuit at the moment $t_1$ will at first be divided capacitively between the condenser 13 and the grid-cathode inherent capacity which, as is known, takes place so that the voltage across condenser 13 has a relationship to that across the grid-cathode capacity that is inversely proportional as compared with the capacity values. Following the setting in of the grid current in the tube, the impulse voltage will now be divided up in accordance with the relative proportion between the resistor 12 and the internal resistance of the grid-cathode path. If, in order to simplify the illustration, it is at first assumed that this inner resistance is independent of the current, the schematic equivalent circuit shown in Fig. 3 will result when the condenser 13 is used.

In this circuit, a voltage source U provides the impulse front together when the switch S is closed suddenly. The resistance condenser member in the grid lead-in is designated by 12, 13, the grid-cathode capacity is $C_i$ and the inner resistance of the grid cathode path is represented by $R_i$. If the condensers $C_i$ and 13 have no charge and the switch S is suddenly closed, the voltage U will at first be distributed in a manner inversely proportional to the ratio of the capacities. However, in this case also a current flows through the resistors $R_i$ and 12 which changes the voltage distribution namely such that in the end the voltages will be distributed proportional to the values of the ohmic resistances. Now, if care is taken that the relationship between condenser 13 and capacitance $C_i$ is the reverse of that between the resistor 12 and $R_i$, in the point P corresponding with the terminal of the control grid, the voltage increases when the switch is closed, and remains thereafter constant. Therefore, at constant value of $R_i$ a plate current can now be attained which is as to form completely true to the impulse. In practice, this form of true amplification of the impulse is also attainable in consideration of the fact that as long as grid current is absent, the inner resistance of the grid cathode path has a much higher value than at the setting in of the grid current. To this end, it is only necessary that the condenser 13 is to be so large as compared with the grid-cathode capacity that the capacitive voltage division produces a grid current in the tube.

The circuit arrangement according to the invention can also be utilized to provide a compensation of a looping of the impulse front such as may take place during passage of the current through the various transmission channels. This is accomplished by choosing the condenser which is connected in parallel to the grid input resistance larger than required on the basis of the abovementioned rule. In this case, there is produced from the rectangular voltage pattern applied to the grid such as shown in Fig. 4, a current pattern which increases in sudden steps at the moment of the steep voltage rise, whereupon it decreases in accordance with an *e*-curve, finally arriving at a finite value. Prior to the steep voltage increase the current has only a finite value if the grid voltage is situated above the line K which corresponds to the lower bend of the plate current-grid voltage characteristic.

What I claim is:

1. In an amplifier wherein distortion of the impressed wave form is caused by the inherent grid-cathode capacity of a thermionic tube, resistive means connected in series between the control grid and the cathode of the thermionic amplifying tube and a condenser connected in parallel with said resistive means, said condenser having a value so that the ratio of the value of the condenser to that of the inherent grid-cathode capacity of the tube is inversely proportional to the ratio of the resistive means with which the condenser is connected in parallel and the internal resistance of the grid-cathode circuit of the tube.

2. In an amplifier wherein distortion of the impressed wave form is caused by the inherent grid-cathode capacity of a thermionic tube, a resistive means connected in series between the control grid and the cathode of the thermionic amplifying tube and a condenser connected in parallel with said resistive means, said condenser having a value such that the ratio of the value of the condenser to the value of the inherent grid-cathode capacity of the tube is greater than the ratio of the internal resistance of the grid-cathode path of the tube and the resistive means with which the condenser is joined in parallel.

MAX GEIGER.